United States Patent [19]

Biagini

[11] Patent Number: 4,763,859
[45] Date of Patent: Aug. 16, 1988

[54] QUICK REPLACEABLE THERMAL CONTROL SYSTEM

[75] Inventor: Guido Biagini, Cherry Valley, Ill.

[73] Assignee: Sundstrand Corporation, Rockford, Ill.

[21] Appl. No.: 877,231

[22] Filed: Jun. 23, 1986

[51] Int. Cl.⁴ .............................................. B64D 13/08
[52] U.S. Cl. ..................................... 244/118.5; 62/382
[58] Field of Search ...................... 244/118.5, 120, 163; 62/302, 448, 382, 299

[56] References Cited

U.S. PATENT DOCUMENTS

| | | | |
|---|---|---|---|
| 2,938,686 | 5/1960 | Van Winkle et al. | 244/118.1 |
| 2,948,498 | 8/1960 | Johnsen et al. | 62/302 |
| 3,230,733 | 1/1966 | Rutishauser et al. | 62/302 |
| 3,438,219 | 4/1969 | Brugler | 62/448 |
| 3,640,492 | 2/1972 | Star | 244/120 |
| 3,712,078 | 1/1973 | Maynard et al. | 62/448 |
| 4,457,140 | 7/1984 | Rastelli | 62/261 |
| 4,591,114 | 5/1986 | Block | 244/120 |

Primary Examiner—Galen Barefoot
Assistant Examiner—Rodney Corl
Attorney, Agent, or Firm—Wood, Dalton, Phillips, Mason & Rowe

[57] ABSTRACT

An environmental control system for affording quick attachment and disconnection of a thermal control unit with respect to an aircraft fuselage. The fuselage includes a compartment communicating with the exterior of the aircraft for receiving the temperature control unit. The control unit is supported on a drawer-like mechanism positionable in the compartment by complementary interengaging guides which provide push-pull movement of the supported control unit into and out of the compartment. Complementary fluid connections and electrical connections on the thermal control unit and the aircraft fuselage are located for interconnection automatically in response to pushing the control unit into position in the fuselage compartment.

5 Claims, 1 Drawing Sheet

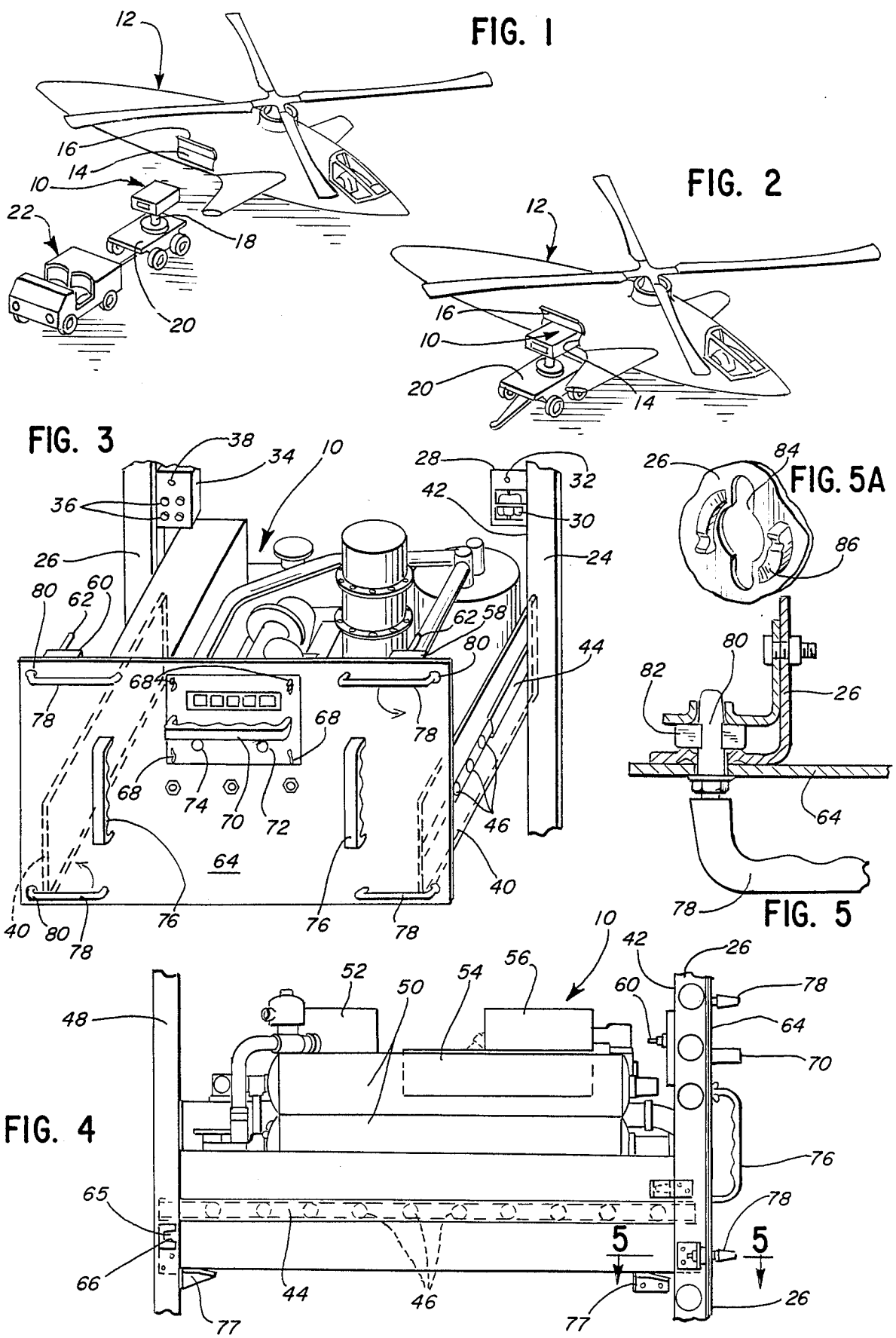

QUICK REPLACEABLE THERMAL CONTROL SYSTEM

FIELD OF THE INVENTION

This invention generally relates to cooling systems and, particularly, to an environmental control system for affording quick attachment and disconnection of a thermal control unit with respect to an aircraft fuselage.

BACKGROUND OF THE INVENTION

There are a wide range of environmental control systems in the aviation industry, such as refrigeration systems for cooling various control or operative components or systems. For instance, vapor cycle cooling systems are used in aircraft as environmental control units to cool various components during operation.

Certain aircraft have vapor cycle cooling systems which are auxiliary to the main systems of the aircraft. The main systems must be cooled by some form of refrigeration or thermal control unit such as the vapor cycle cooling system.

One of the major problems with such support systems is the maintainability or serviceability thereof. A vapor cycle cooling system includes such mechanisms as compressors, condensers, condenser fans, evaporators, motors and other related control mechanisms. Should any of these devices become inoperative, heretofore it has been common either to make attempts to replace or repair the inoperative device or to remove the entire thermal control unit and replace the unit with a completely operative system. In the past, such maintenance or service required a variety of tools and consumed an inordinate amount of time ranging from an hour to the better part of a day. When dealing with maintainability or serviceability on the flight line, time consumption can be disasterous. These problems are magnified when maintenance or servicing must be done in circumstances of rain, wind or cold conditions, as well as when dealing with non-technical maintenance personnel.

There is a need for and this invention is directed to providing a new environmental control system wherein a thermal control unit can be attached and disconnected readily and with speed, and without requiring any tools whatsoever. The invention provides a support system affording maintainability and serviceability not heretofore available.

SUMMARY OF THE INVENTION

An object, therefore, of the invention is to provide a new and improved environmental control system for affording quick attachment and disconnection of a thermal control unit with respect to an aircraft fuselage, thereby providing a support system with ready maintenance and serviceability.

In the exemplary embodiment of the invention, the system generally includes means defining a compartment in the aircraft fuselage communicating with the exterior of the aircraft for receiving the temperature control unit. Drawer-like support means are positionable in the compartment for mounting and supporting the temperature control unit.

Complementary interengaging guide means are provided between the support means and the aircraft fuselage along the compartment for providing push-pull movement of the supported control unit into and out of the compartment. Complementary fluid connections and electrical connections are provided on the thermal control unit and the aircraft fuselage, the connections being located for interconnection automatically in response to pushing the control unit into position in the fuselage compartment.

Preferably, the guide means include roller means, and sufficient transverse tolerances are provided for easy lifting of the supported control unit off of the guide means of the aircraft fuselage for complete removal of the control unit.

Another feature of the invention is means for automatically locating the thermal control unit in the fuselage compartment and mating the fluid and electrical connections in response to pushing the control unit into position in the compartment. Specifically, the locating means include at least one, generally cone-shaped pin on the thermal control unit and a mating, generally cone-shaped guide recess on the aircraft fuselage for receiving the cone-shaped pin, whereby a sufficiently tight fit is provided to prevent movement of the thermal control unit in all transverse directions when the control unit is fully positioned in the fuselage compartment.

Another feature of the invention is the provision of complementary locking means between the thermal control unit and the aircraft fuselage for locking the control unit in the fuselage compartment. Specifically, the locking means include a manually manipulatable handle having a locking member rotatable into locking engagement with a complementary latch member on the fuselage. The locking member and the latch member have complementary interengaging wedge means for drawing the thermal control unit into tight position in the fuselage compartment.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a perspective view of a thermal control unit according to the invention being transported to an aircraft;

FIG. 2 is a view similar to that of FIG. 1, with the control unit in position for movement into the aircraft fuselage;

FIG. 3 is a perspective view, on an enlarged scale, of the thermal control unit projecting outwardly of the aircraft fuselage;

FIG. 4 is a side elevational view of the thermal control unit and surrounding fuselage framework;

FIG. 5 is a section, on an enlarged scale, taken generally along line 5—5 of FIG. 4, and showing the locking means for the thermal control unit; and FIG. 5A is a perspective view of the locking wedges for the rotatable handles.

DETAILED DESCRIPTION OF THE PREFERRED EMBODIMENT

Referring to the drawings in greater detail, and first to FIG. 1, the invention generally is embodied in an environmental control system for affording quick attachment and disconnection of a thermal control unit, generally designated 10, with respect to the fuselage of an aircraft, generally designated 12. The aircraft includes an access opening 14 for the thermal control unit, with a door 16 for closing the access opening after the control unit is positioned within the fuselage. The thermal control unit is illustrated as being transported to the aircraft on top of a pedestal 18 projecting upwardly from a trailer 20 movable by a hauler, generally designated 22.

FIG. 2 shows thermal control unit 10 having been backed into position for pushing through access opening 14 into the aircraft fuselage by appropriate service personnel. Hauler 22 has been disconnected from trailer 20 for continuous service purposes. After the control unit has been pushed into the aircraft fuselage, trailer 20 is moved away and the aircraft is immediately ready for flight operations. It can be seen that this procedure is practically immediate and, as will be apparent hereinafter, is accomplished without the use of tools within a matter of a few minutes, versus the lengthy time required in the past to service and maintain control or cooling systems heretofore available.

More particularly, referring to FIG. 3, the aircraft fuselage includes a pair of upright frame members 24 and 26 between which thermal control unit 10 is positionable by a push-pull action. A control box 28 is provided on the inside of frame member 24 and has electrical connections, generally designated 30, as well as a guide aperture 32 for purposes described hereinafter. A control box 34 is provided on the inside of frame member 26 and includes fluid connections 36, as well as a guide aperture 38 for purposes described hereinafter.

Complementary interengaging guide means are provided between side support panels 40 of thermal control unit 10 and frame members 24,26 of the aircraft fuselage for providing a push-pull movement of the supported control unit into and out of a compartment 42 defined between fuselage frame members 24,26. More particularly, the guide means include a slide rail 44 mounted on the aircraft fuselage (including frame members 24,26) for receiving rollers 46 rotatable mounted on the outside of support panels 40. Guide rail 44 itself is movable in the direction of movement of the control unit and includes conventional latch means (not shown) for defining an outer limit of movement of the control unit. As is known in drawer-type sliding mechanisms, the latch means is releasable to allow for complete outward movement and removal of the control unit.

Referring to FIG. 4, in conjunction with FIG. 3, it can be seen that guide rails 44 extend rearwardly from frame members 24 and 26 which define the front of compartment 42. The aircraft fuselage includes a similar pair of rear upright frame members 48. Guide rail 44 extends between front frame members 24,26 and rear frame members 48 for receiving rollers 46 in rolling engagement therewith.

The environmental control system includes thermal control unit 10, as seen in FIG. 4, having conventional components such as a condenser 50, a topper/charger 52, a motor speed control 54, and a filter/rectifier 56; as well as other components such as a compressor, an evaporator and the like (not shown).

The thermal control unit includes electrical connections 58 (FIG. 3) and fluid connections 60 (FIGS. 3 and 4) for mating with electrical and fluid connections 30 and 36, respectively, mounted on the aircraft fuselage. These connections or matings are located for interconnection automatically in response to pushing the control unit into position in the fuselage compartment in the direction of arrows "A" (FIGS. 3 and 4).

Means are provided for automatically locating the thermal control unit 10 in fuselage compartment 42 and mating electrical connections 30,58 and fluid connections 36,60 in response to pushing the control unit into position in the compartment. More particularly, guide pins 62 are provided, projecting inwardly from the top corners of a front panel 64 of the control unit. The guide pins are movable into guide apertures 32,38 as the control unit is pushed into the compartment in the direction of arrows "A". Other cone-shaped pins 65 (FIG. 4) are provided, their number and location being dependent upon the particular control unit configuration, to prevent lateral or transverse movement of thermal control unit 10 in all transverse directions when the control unit is fully positioned in the fuselage compartment. These pins 65 and corresponding guide recesses 66 on the aircraft framework are generally complementarily cone-shaped to provide a sufficiently tight fit.

Guide pins 62 are provided as locating pins to facilitate mating the electrical and fluid connections. Pins 65 are structural members that prevent lateral and transverse movement of the thermal control unit after the unit is fully positioned in the fuselage compartment.

Finally, ramp-like lift brackets 77 (FIG. 4) assist in guiding pins 65 into recesses 66 and also take the weight of the unit off rollers 46.

Front panel 64 of thermal control unit 10 includes a control box, generally designated 67 (FIG. 3), which is removable by fastening means 68 and a handle 70. The control box includes conventional components such as a microprocessor controller, and includes such means as a test connector 72 and signal light means 74 on the front face of the control box. A pair of manually graspable handles 76 also are provided on the front face of front panel 64 of the thermal control unit to facilitate pushing and pulling the control unit into and out of the fuselage compartment by service personnel.

Complementary latch or locking means are provided between thermal control unit 10 and the aircraft fuselage (namely fuselage frame members 24,26) for locking the control unit in fuselage compartment 42 when fully positioned thereinto. More particularly, FIGS. 3 and 4 show four locking handles 78 mounted on front panel 64 of the control unit. The handles are pivotable about shafts 80 projecting through the front panel. The handles are pivotable about the shafts, as indicated by arrows "B" in FIG. 3.

FIGS. 5 and 5A show in greater detail the locking means operable by locking handles 78 at the four corners of front panel 64 of the thermal control unit. Specifically, a locking member 82 is fixed to each shaft 80 of each locking handle 78, the locking member being located beyond the inner face of front panel 64. The locking members initially are inserted through keyhole shaped apertures 84 (FIG. 5A) in frame members 24,26 and then rotated to ride along wedge shaped locking cams 86 formed on the inside of the frame members. In essence, the frame members are shown as right-angled members to provide means behind which the locking members are positionable. The locking cams 86 provide complementary interengaging, ramp-like camming means for drawing the thermal control unit into tight position in the fuselage compartment to thereby fully mate electrical connections 30,58; fluid connections 36,60; guide pins 62 with guide apertures 32,38; and cone-shaped pins 65 with guide recesses 66.

From the foregoing, it can be seen that thermal control unit 10 is easily and quickly located, positioned and locked in compartment 42 of the aircraft fuselage without any tools whatsoever and the fluid and electrical connections between the control unit and the aircraft are automatically interconnected in response to such positioning and locking. This is accomplished in a matter of minutes to save precious time when dealing with adverse conditions on the flight line to achieve serviceability and maintainability not heretofore available.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. An environmental control system for affording quick attachment and disconnection of a thermal control unit with respect to an aircraft fuselage, comprising:
   means defining a compartment in the aircraft fuselage communicating with the exterior of the aircraft for receiving the thermal control unit;
   drawer-like support means positionable in the compartment for mounting and supporting the thermal control unit;
   complementary interengaging guide means between the support means and the aircraft fuselage along the compartment for providing push-pull movement of the supported thermal control unit into and out of the comparment;
   complementary fluid connections and electrical connections on the thermal control unit and the aircraft fuselage, the connections being located for interconnection automatically in response to pushing the thermal control unit into position in the fuselage compartment; and
   means for automatically locating the thermal control unit in final position in the fuselage compartment in response to pushing the control unit fully into the compartment, including at least one guide pin and mating guide aperture of complementary cone-shapes and of a sufficient tight fit to prevent movement of the thermal control unit in all transverse directions when the control unit is fully positioned in the fuselage compartment.

2. An environmental control system for affording quick attachment and disconnection of a thermal control unit with respect to an aircraft fuselage, comprising:
   means defining a compartment in the aircraft fuselage communicating with the exterior of the aircraft for receiving the thermal control unit;
   drawer-like support means positionable in the compartment for mounting and supporting the thermal control unit;
   complementary interengaging guide means between the support means and the aircraft fuselage along the compartment for providing push-pull movement of the supported thermal control unit into and out of the compartment;
   complementary fluid connections and electrical connections on the thermal control unit and the aircraft fuselage, the connections being located for interconnection automatically in response to pushing the thermal control unit into position in the fuselage compartment; and
   complementary locking means between the thermal control unit and the aircraft fuselage for locking the control unit in the fuselage comparment, including a manually manipulatable handle having a locking member rotatable into locking position with latch means on the fuselage, the locking member and latch means having complementary interengaging wedge means for drawing the thermal control unit into tight position in the fuselage compartment.

3. An environmental control system for affording quick attachment and disconnection of a thermal control unit with respect to an aircraft fuselage, comprising:
   means defining a compartment in the aircraft fuselage communicating with the exterior of the aircraft for receiving the thermal control unit;
   drawer-like support means positionable in the compartment for mounting and supporting the thermal control unit;
   complementary interengaging guide means between the support means and the aircraft fuselage along the compartment for providing push-pull movement of the supported thermal control unit into and out of the compartment;
   complementary fluid connections and electrical connections on the thermal control unit and the aircraft fuselage, the connections being located for interconnection automatically in response to pushing the thermal control unit into the position in the fuselage compartment;
   means for automatically locating the thermal control unit in final position in the fuselage compartment in response to pushing the control unit fully into the compartment, including at least one guide pin and mating guide aperture of complementary cone-shapes and of a sufficient tight fit to prevent movement of the thermal control unit in all transverse directions when the control unit is fully positioned in the fuselage compartment; and
   complementary locking means between the thermal control unit and the aircraft fuselage for locking the thermal control unit in the fuselage compartment.

4. An enviromental control system for affording quick attachment and disconnection of a thermal control unit with respect to an aircraft fuselage, comprising:
   means defining a compartment in the aircraft fuselage communicating with the exterior of the aircraft for receiving the thermal control unit;
   drawer-like support means positionable in the compartment for mounting and supporting the thermal control unit;
   complementary interengaging guide means between the support means and the aircraft fuselage along the compartment for providing push-pull movement of the supported thermal control unit into and out of the compartment;
   complementary fluid connections and electrical connections on the thermal control unit and the aircraft fuselage, the connections being located for interconnection automatically in response to pushing the thermal control unit into position in the fuselage compartment;
   means for automatically locating the thermal control unit in the fuselage compartment and mating said connections in response to pushing the thermal control unit into position in the compartment; and complementary locking means between the thermal control unit and the aircraft fuselage for locking the control unit in the fuselage compartment, including a manually manipulatable handle having a locking member rotatable into locking position with latch means on the fuselage, the locking member and latch means having complementary interengaging wedge means for drawing the thermal control unit into tight position in the fuselage compartment.

5. An environmental control system for affording quick attachment and disconnection of a thermal control unit with respect to an aircraft fuselage, comprising:

means defining a compartment in the aircraft fuselage communicating with the exterior of the aircraft for receiving the thermal control unit;

drawer-like support means positionable in the compartment for mounting and supporting the thermal control unit;

complementary interengaging guide means between the support means and the aircraft fuselage along the compartment for providing push-pull movement of the supported thermal control unit into and out of the compartment;

complementary fluid connections and electrical connections on the thermal control unit and the aircraft fuselage, the connections being located for interconnection automatically in response to pushing the thermal control unit into position in the fuselage compartment; and means for automatically locating the thermal control unit in final position in the fuselage compartment in response to pushing the control unit fully into the compartment, including mating guide members of complementary shapes and of sufficient tight fit to prevent movement of the thermal control unit in all transverse directions when the control unit is fully positioned in the fuselage compartment.

* * * * *